United States Patent

Bennin et al.

[11] Patent Number: 5,982,584
[45] Date of Patent: Nov. 9, 1999

[54] INTEGRATED LEAD SUSPENSION FLEXURE WITH SERIALLY ARRANGED METAL-BACKED AND SUSPENDED INSULATOR PORTIONS FOR HYGROTHERMAL COMPENSATION

[75] Inventors: Jeffry S. Bennin, Hutchinson; Todd W. Boucher, Stewart; Anthony J. Liberko, Hutchinson; Raymond A. Loehlein, Mound; Robert J. Matz, Cologne; Gabriel M. Montes, Hutchinson; Karupanan Supramaniam, Hopkins, all of Minn.

[73] Assignee: Hutchinson Technology Incorporated, Hutchinson, Minn.

[21] Appl. No.: 08/993,916

[22] Filed: Dec. 18, 1997

Related U.S. Application Data

[60] Provisional application No. 60/034,791, Dec. 19, 1996.

[51] Int. Cl.[6] .............................. G11B 5/48; G11B 33/14
[52] U.S. Cl. ........................................ 360/104; 360/97.02
[58] Field of Search .................................... 360/104, 106, 360/97.02, 97.03, 97.04

[56] References Cited

U.S. PATENT DOCUMENTS

| | | | |
|---|---|---|---|
| 4,543,295 | 9/1985 | St. Clair et al. | 428/458 |
| 4,616,279 | 10/1986 | Poorman | 360/103 |

(List continued on next page.)

FOREIGN PATENT DOCUMENTS

| | | |
|---|---|---|
| 0 599 669 A2 | 6/1994 | European Pat. Off. . |
| 0 764 942 A1 | 3/1997 | European Pat. Off. . |
| 0834865A1 | 4/1998 | European Pat. Off. . |
| 53-19015 | 2/1978 | Japan . |
| 53-30310 | 3/1978 | Japan . |
| 60-246015 | 12/1985 | Japan . |
| 4-146516 | 5/1992 | Japan . |
| 90-9016932 | 1/1997 | Japan . |
| 2 292 826 | 3/1996 | United Kingdom . |
| 2 295 918 | 6/1996 | United Kingdom . |
| 2 312 082 | 10/1997 | United Kingdom . |
| WO 95/13609 | 5/1995 | WIPO . |
| WO 96/42080 | 12/1996 | WIPO . |
| WO 97/35302 | 9/1997 | WIPO . |
| WO 97/35303 | 9/1997 | WIPO . |
| WO 97/36290 | 10/1997 | WIPO . |

*Primary Examiner*—William J. Klimowicz
*Attorney, Agent, or Firm*—Faegre & Benson

[57] ABSTRACT

An integrated lead suspension flexure including a metal spring layer having a metal base region, a metal head bonding platform, and one or more metal spring arms connecting the metal head bonding platform to the metal base region for flexure motion. The flexure also includes a conductive lead layer having a surface facing the metal spring layer and extending between the metal base region and the metal head bonding platform. The conductive lead layer has lead base region portions extending over the metal base region, lead metal-backed arm portions extending over the metal spring arms, and lead suspended portions extending from at least one of the lead metal-backed arm portions. The flexure further includes a hygroscopic insulator layer between the metal spring layer and the conductive lead layer having insulator base region portions for bonding the lead base region portions to and insulating the lead base region portions from the metal base region, insulator metal-backed arm portions for bonding the lead metal-backed arm portions to and insulating the lead metal-backed arm portions from the metal spring arms, and insulator suspended portions on the lower surface of the lead suspended portions. A first curvature is induced on each insulator metal-backed arm portion and a second curvature is induced on each insulator suspended portion when the insulator layer undergoes volumetric variations. The insulator metal-backed arm portions and insulator suspended portions have a serial arrangement so that the direction of the first curvature opposes the direction of the second curvature.

10 Claims, 11 Drawing Sheets

U.S. PATENT DOCUMENTS

| | | | |
|---|---|---|---|
| 4,789,914 | 12/1988 | Ainslie et al. | 360/103 |
| 4,996,623 | 2/1991 | Erpelding et al. | 360/104 |
| 5,103,359 | 4/1992 | Marazzo | 360/104 |
| 5,331,489 | 7/1994 | Johnson et al. | 360/104 |
| 5,391,842 | 2/1995 | Bennin et al. | 174/260 |
| 5,422,764 | 6/1995 | McIlvanie | 360/97.01 |
| 5,490,027 | 2/1996 | Hamilton et al. | 360/104 |
| 5,491,597 | 2/1996 | Bennin et al. | 360/104 |
| 5,594,607 | 1/1997 | Erpelding et al. | 360/104 |
| 5,597,496 | 1/1997 | Masaichi et al. | 216/94 |
| 5,598,307 | 1/1997 | Bennin | 360/104 |
| 5,606,477 | 2/1997 | Erpelding et al. | 360/104 |
| 5,608,591 | 3/1997 | Klaassen | 360/104 |
| 5,617,274 | 4/1997 | Ruiz | 360/104 |
| 5,630,948 | 5/1997 | Ueda | 216/20 |
| 5,631,786 | 5/1997 | Erpelding | 360/97.01 |
| 5,645,735 | 7/1997 | Bennin et al. | 216/22 |
| 5,661,896 | 9/1997 | Erpelding | 29/603.01 |
| 5,666,717 | 9/1997 | Matsumoto et al. | 29/603.12 |
| 5,673,484 | 10/1997 | Masaichi et al. | 29/896.93 |
| 5,680,275 | 10/1997 | Frater et al. | 360/104 |
| 5,687,479 | 11/1997 | Bennin et al. | 29/885 |
| 5,699,212 | 12/1997 | Erpelding et al. | 360/104 |
| 5,701,218 | 12/1997 | Boutaghou | 360/104 |
| 5,719,726 | 2/1998 | Hayakawa | 360/104 |
| 5,734,524 | 3/1998 | Ruiz | 360/104 |
| 5,739,982 | 4/1998 | Arya et al. | 360/104 |
| 5,754,368 | 5/1998 | Shiraishi et al. | 360/104 |
| 5,757,585 | 5/1998 | Aoyagi et al. | 360/104 |
| 5,781,379 | 7/1998 | Erpelding et al. | 360/104 |
| 5,796,556 | 8/1998 | Boutaghou | 360/104 |
| 5,805,381 | 9/1998 | Resh | 360/104 |
| 5,835,306 | 11/1998 | Bennin | 360/104 |

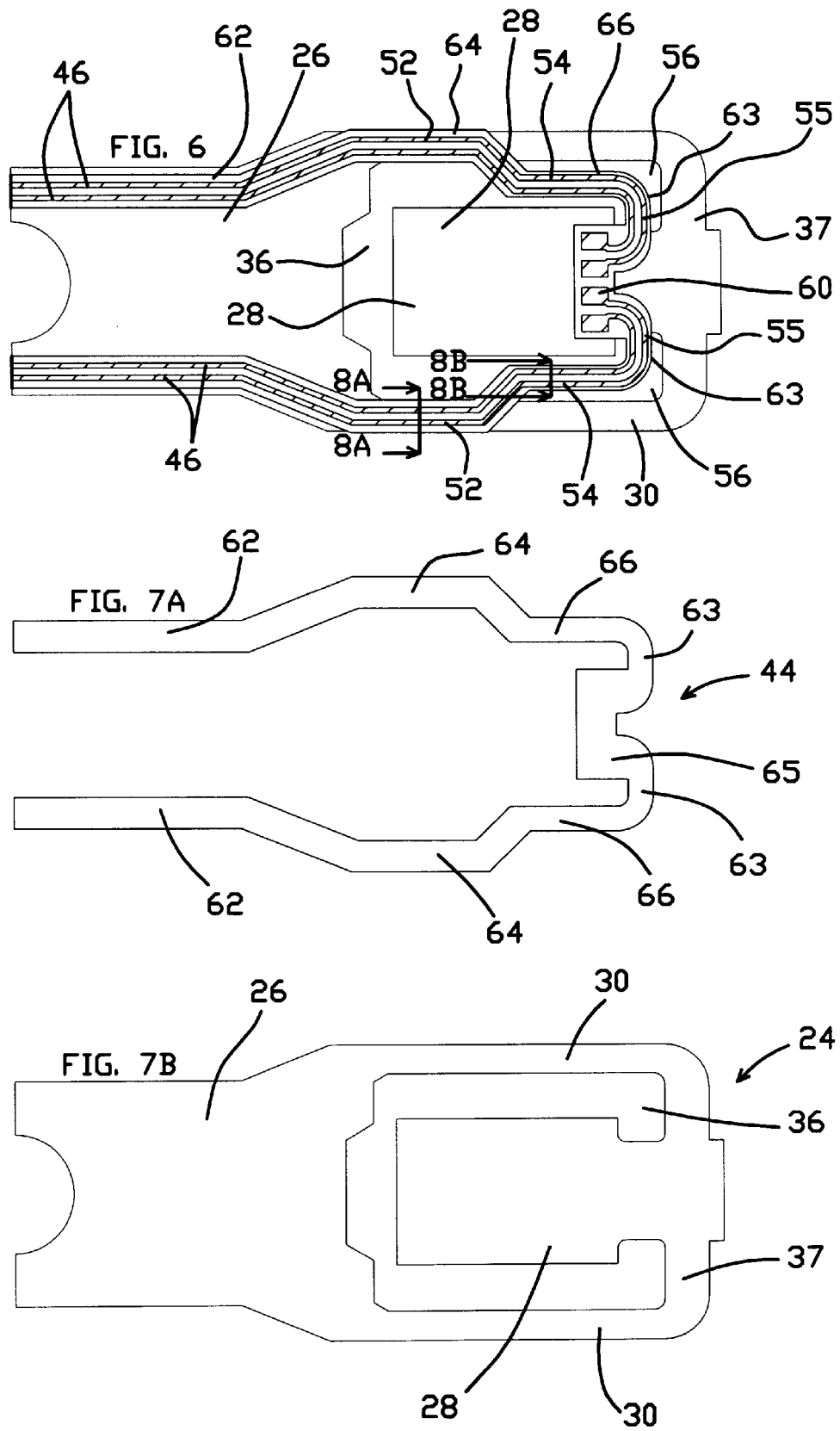

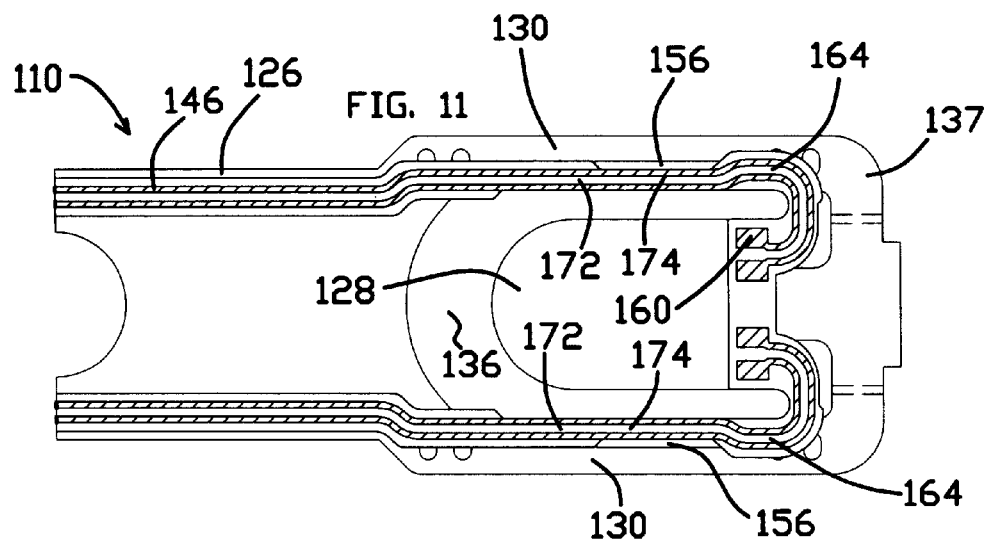
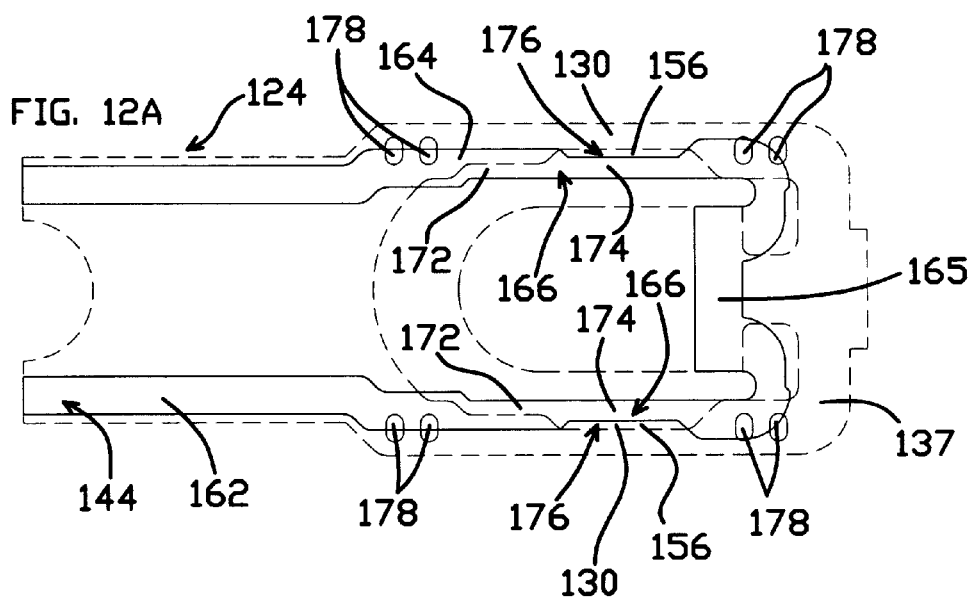
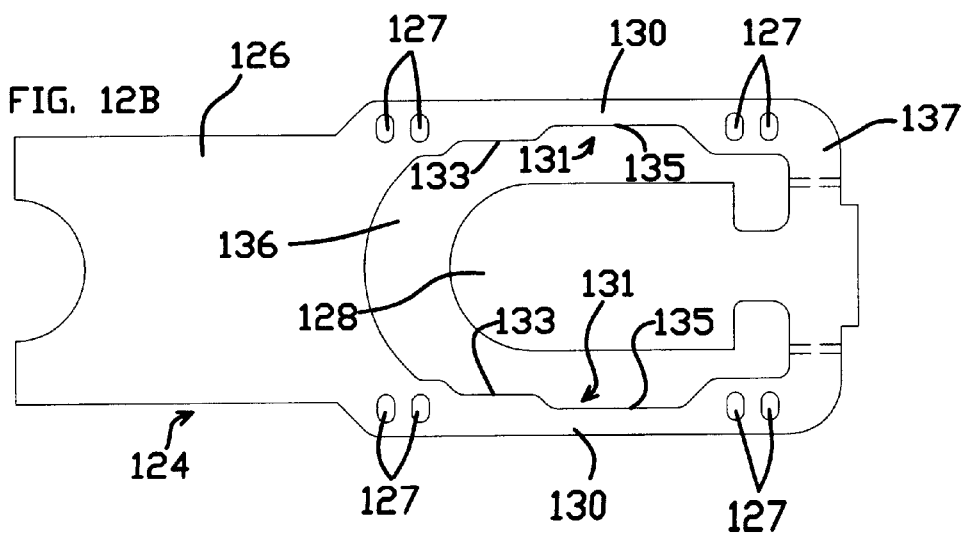

INTEGRATED LEAD SUSPENSION FLEXURE WITH SERIALLY ARRANGED METAL-BACKED AND SUSPENDED INSULATOR PORTIONS FOR HYGROTHERMAL COMPENSATION

REFERENCE TO RELATED APPLICATION

This application claims the benefit of U.S. Provisional Application Ser. No. 60/034,791 filed on Dec. 19, 1996.

BACKGROUND OF THE INVENTION

1. Field of the Invention

The present invention relates generally to head suspensions for rigid magnetic disk drives. In particular, the present invention is a flexure for an integrated lead suspension having metal-backed and suspended insulator portions that are serially arranged so that distortion due to changes in the dielectric insulator layer is reduced.

2. Description of the Related Art

Head suspensions for supporting read/write head sliders above the rotating media in magnetic disk drives are in widespread use and disclosed generally in the Christianson et al. U.S. Pat. No. 5,461,525. Head suspensions of this type typically include a stainless steel (spring material) load beam having a mounting region on a proximal end, a rigid region having stiffening rails on its opposite sides, a radius or spring region between the rigid region and mounting region, and a gimbal or flexure located on the distal end of the load beam. In the embodiment shown in the Christianson et al. Patent, the flexure is manufactured and formed separately from the load beam and subsequently mounted to the load beam. Other types of head suspensions such as those shown in the Blaeser et al. U.S. Pat. No. 5,198,945 include what is known as an integral gimbal which is formed directly on the distal end of the load beam. The mounting region of the head suspension is adapted to be mounted to a rotary actuator in the disk drive, and typically has a base plate welded thereto for added rigidity.

A read/write head slider is mounted, usually by adhesive, to the flexure of the head suspension. The read/write head slider is commonly electrically connected to electronic circuitry in the disk drive by lead wires. The lead wires are ultrasonically bonded, soldered or otherwise attached to terminals on the read/write head slider and extend along the length of the head suspension to the mounting region. Tabs are often included on the rigid region and mounting region to secure the lead wires to the suspension. However, lead wires are relatively difficult to attach and add undesirable stiffness and weight to the head suspension.

Alternatives to head suspensions with conventional wire leads are known as integrated lead or "wireless" suspensions. A number of different types of integrated lead suspensions are commercially available. One such type of integrated lead suspension is disclosed generally in the Bennin U.S. Pat. No. 5,598,307. The suspension shown in this patent is fabricated from a laminated sheet of material including a stainless steel spring material layer and a copper conductive layer which are bonded together by a dielectric insulator layer. The load beam and flexure are formed from the stainless steel layer by a photolithographic chemical etching process. The integrated leads are formed from the conductive and insulator layers by a similar process.

The Bennin et al. U.S. Pat. No. 5,491,597 discloses a head suspension which is assembled from a load beam and a gimbal-interconnect assembly. The gimbal-interconnect assembly is etched from a layer of conductive spring material, coated with an insulating dielectric, and mounted to the load beam.

As disk drive technology progresses, head suspensions must be manufactured to more demanding tolerances. Factors that were of secondary importance when tolerances were less demanding are becoming increasingly important. One such factor is how the materials used to fabricate head suspensions react to changing environmental conditions. In particular, dielectric materials commonly used to form an insulator layer of the integrated lead suspension are typically formed from polar polymers which are typically hygroscopic. The use of hygroscopic materials in the insulator layer causes the insulator layer to volumetrically expand in environments with increasing relative humidity. Similarly, the volume of these dielectric materials varies with temperature. Variations in the volume of the insulator layer (caused by hygroscopic and/or thermal stresses) can affect head suspension characteristics such as static attitude.

There is a need for a flexure for an integrated lead suspension that reduces the effects from changes in the insulator layer. To be commercially viable, any such technology must balance several competing design concerns. The integrated lead suspension flexure must be designed with electrical characteristics that facilitate the attachment of and communication with the head slider. In addition, the mechanical characteristics of the integrated lead suspension flexure must be optimized. Flexure stiffness should generally be relatively low in pitch and roll axes to allow proper gimbal action, but relatively high in lateral stiffness to prevent lateral flexure distortion during drive operation. What is needed is an integrated lead suspension flexure that is relatively stable in changing humidity and temperature environments while still allowing for appropriate gimbal action.

SUMMARY OF THE INVENTION

The present invention is an integrated lead suspension flexure and method of fabrication. The flexure has metal-backed and suspended insulator portions that are serially arranged so that distortion due to changes in the insulator layer is reduced.

One embodiment of the integrated lead suspension flexure includes a metal spring layer having a metal base region, a metal head bonding platform, and one or more metal spring arms connecting the metal head bonding platform to the metal base region for flexure motion. The flexure also includes a conductive lead layer having a surface facing the metal spring layer and extending between the metal base region and the metal head bonding platform. The conductive lead layer has lead base region portions extending over the metal base region, lead metal-backed arm portions extending over the metal spring arms, and lead suspended portions extending from at least one of the lead metal-backed arm portions. The flexure further includes an insulator layer between the metal spring layer and the conductive lead layer having insulator base region portions for bonding the lead base region portions to and insulating the lead base region portions from the metal base region, insulator metalbacked arm portions for bonding the lead metal-backed arm portions to and insulating the lead metal-backed arm portions from the metal spring arms, and insulator suspended portions on the lower surface of the lead suspended portions. A first curvature is induced on each insulator metal-backed arm portion and a second curvature is induced on each insulator suspended portion when the insulator layer undergoes volumetric variations. The insulator metal-backed arm portions and insulator suspended portions have a serial arrangement so that the direction of the first curvature opposes the direction of the second curvature.

BRIEF DESCRIPTION OF THE DRAWINGS

FIG. 6 is a detailed top view of the gimbal region of the flexure shown in FIG. 4.

FIGS. 7A-7B are top views of the insulator layer and the metal spring layer, respectively, of the gimbal region shown in FIG. 6.

FIG. 11 is a top view of a gimbal region of a flexure according to a second embodiment of the present invention.

FIGS. 12A-12B are top views of the insulator layer and the metal spring layer, respectively, of the gimbal region shown in FIG. 11.

DETAILED DESCRIPTION OF THE PREFERRED EMBODIMENTS

The dielectric materials that are commonly used in the insulator layers of conventional integrated lead suspensions are hygroscopic, i.e., they readily absorb and release moisture. When moved from a relatively dry environment to a relatively humid environment (e.g., a 50% change in relative humidity), these dielectric materials absorb moisture from the environment and volumetrically expand.

Figure 1A:
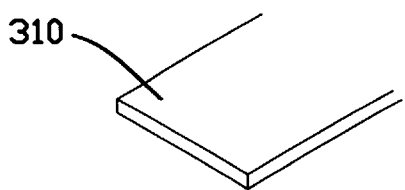
FIGS. 1A–1E are cross sectional isometric views of various conventional combinations of dielectric and metal layers under relatively dry conditions.
Figure 2A:
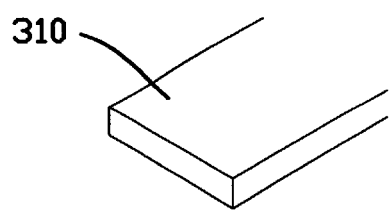
FIGS. 2A–2E are cross sectional isometric views of the structures shown in FIGS. 1A–1E, respectively, under relatively humid conditions.
Figure 1B:
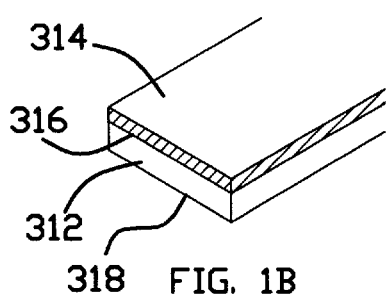
Figure 2B:
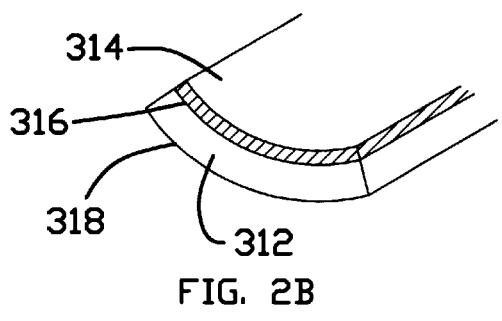
Figure 1C:
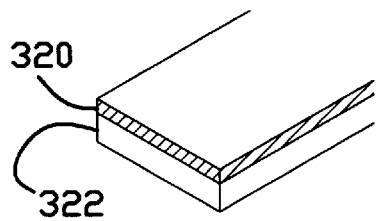
Figure 2C:
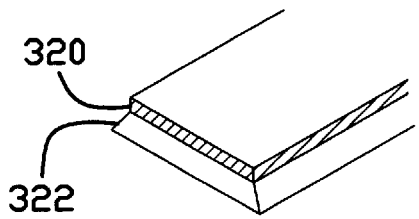
Figure 1D:
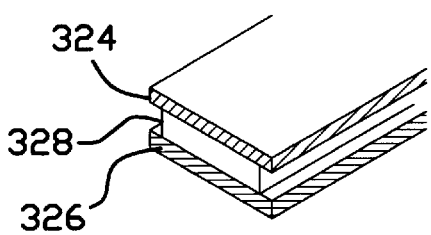
Figure 2D:
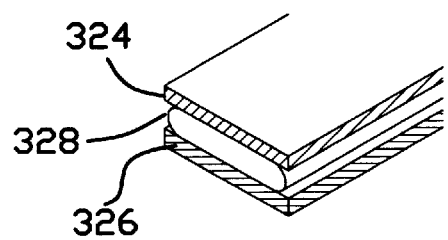

FIGS. 1A–1E and 2A–2E generally illustrate how various conventional combinations of dielectric and metal layers undergo hygroscopic deformation when moved from a relatively dry environment (shown in FIGS. 1A–1E) to a relatively humid environment (shown in FIGS. 2A–2E). FIG. 1A shows a relatively dry free dielectric film 310 (e.g., polyimide or epoxy). When subjected to relatively humid conditions, the film expands volumetrically in all directions as shown in FIG. 2A. FIG. 1B shows a dielectric film 312 attached to a sheet of relatively thin, thus relatively low stiffness, metal 314 (e.g., a 20 micrometer thick sheet of 302 stainless steel). As shown in FIG. 2B, when subjected to relatively humid conditions a face 316 of the film 312 that is attached to the metal sheet 314 cannot expand while a free face 318 can expand. This causes an unbalanced internal strain which results in a material curvature as shown in FIG. 2B. When a relatively thicker, thus relatively higher stiffness, supporting sheet 320 (e.g., a 75 micrometer thick sheet of 302 stainless steel) is attached to a dielectric film 322, as is shown in FIG. 2C, curvature is reduced in relatively humid conditions. Curvature can also be reduced, as shown in FIGS. 1D and 2D, by attaching metal sheets 324 and 326 to two opposing faces of a dielectric film 328, which allows midplane expansion of the dielectric film 328 while anchoring the top and bottom dielectric surfaces to prevent general curvature.

Figure 1E:
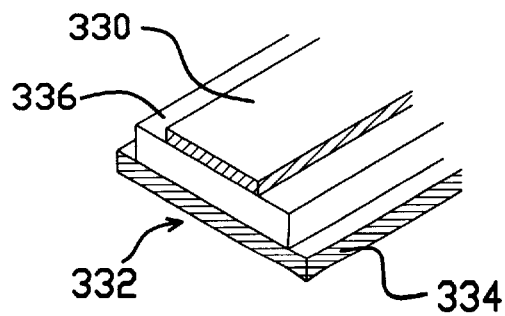
Figure 2E:
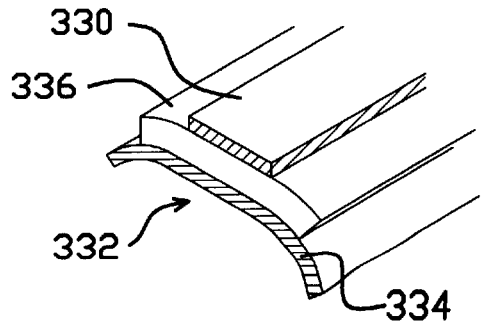

FIG. 1E depicts a portion 332 of a conventional integrated lead structure with a conductive lead 330. A metal layer 334 with a relatively low stiffness in the pitch and roll directions (e.g., a 20 micrometer thick sheet of 302 stainless steel) is used so as to allow gimbal action. However, this relatively low stiffness allows a curvature to develop when the portion 332 is subjected to changing relative humidity conditions as shown in FIG. 2E. Although the lead 330 is attached to a portion of a dielectric film 336 opposite the metal layer 334, the lead's surface area is smaller than that of the dielectric portion 336, which allows lateral expansion of the dielectric top surface resulting in curvature.

Also, the dielectric materials that are commonly used in the insulator layers of conventional integrated lead suspensions typically have thermal coefficients of expansion that are relatively higher than the thermal coefficients of expansion of the metals commonly used in the metal spring and conductive lead layers of conventional integrated lead suspensions. When exposed to temperature changes, the dielectric layers used in the insulator layers will expand (and contract) to a greater degree than the surrounding metal layers, and curvature effects fairly similar to the humidity curvature effects shown in FIGS. 1A–1E and 2A–2E will occur to some degree. Thus, the hygroscopic and/or thermal (i.e., "hygrothermal") properties of the insulator layer materials can produce changes in the insulator layer that can affect head suspension characteristics such as static attitude.

Figure 3:
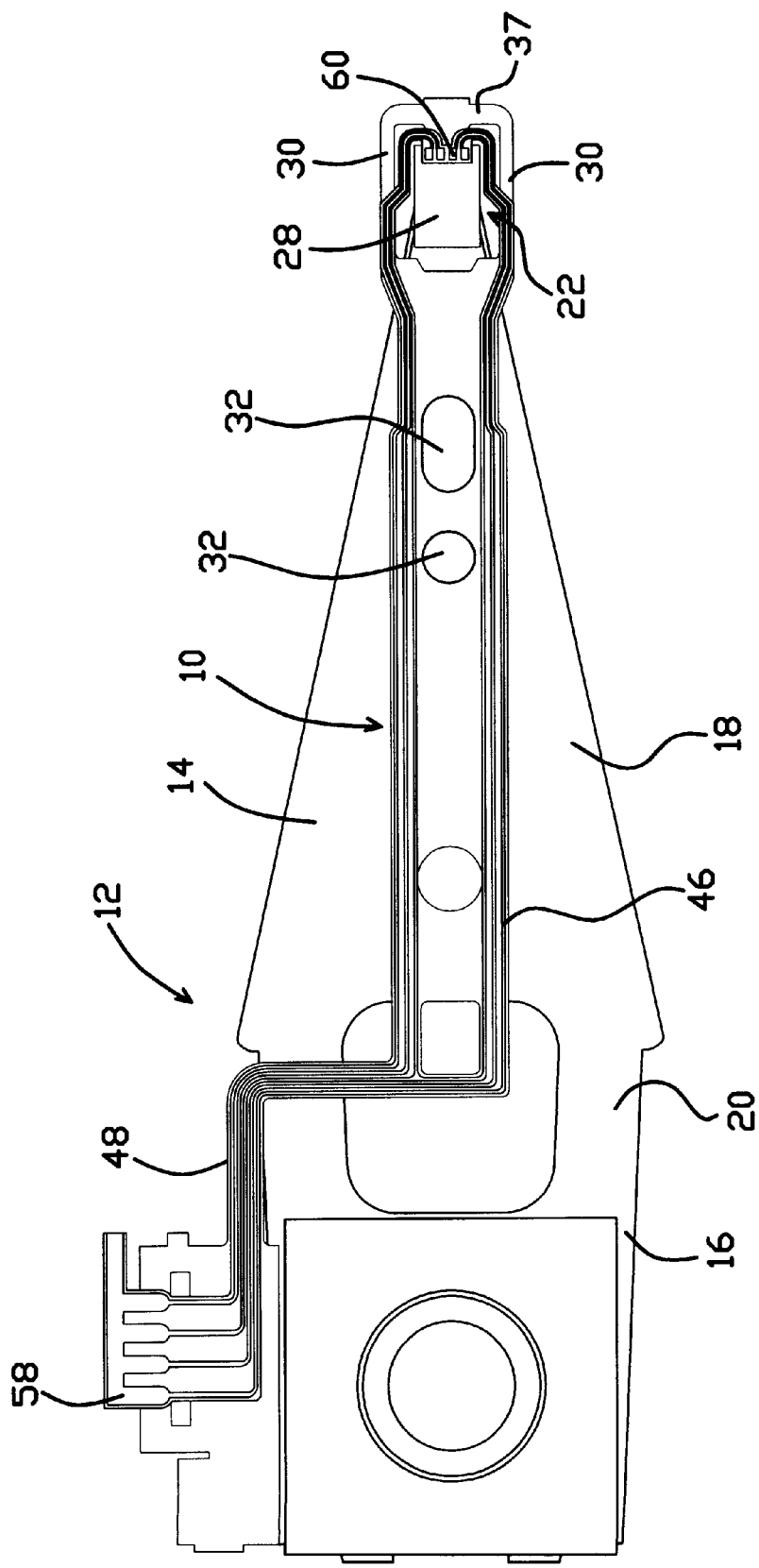
FIG. 3 is a top view of a head suspension having a flexure according to one embodiment of the present invention.
Figure 4:
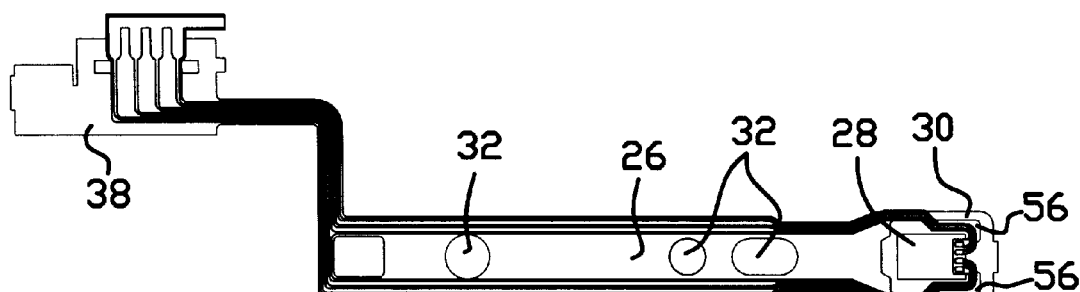
FIG. 4 is a top view of the flexure of the head suspension shown in FIG. 3.
Figure 5A:
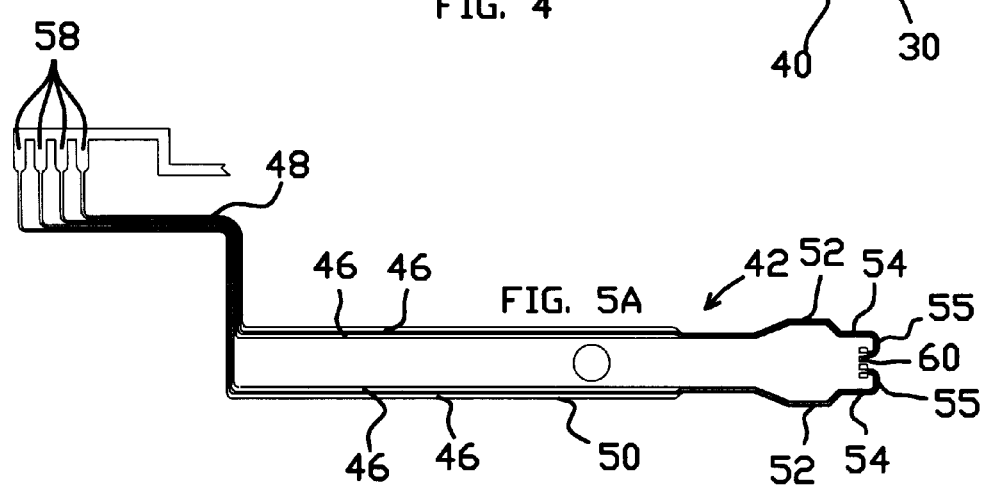
FIGS. 5A–5C are top views of the conductive lead layer, the insulator layer, and the metal spring layer, respectively, of the flexure shown in FIG. 4.
Figure 5B:
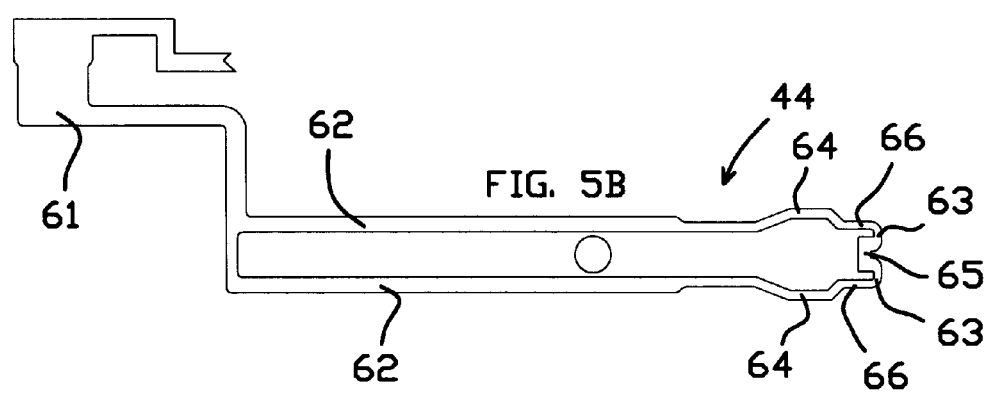
Figure 5C:
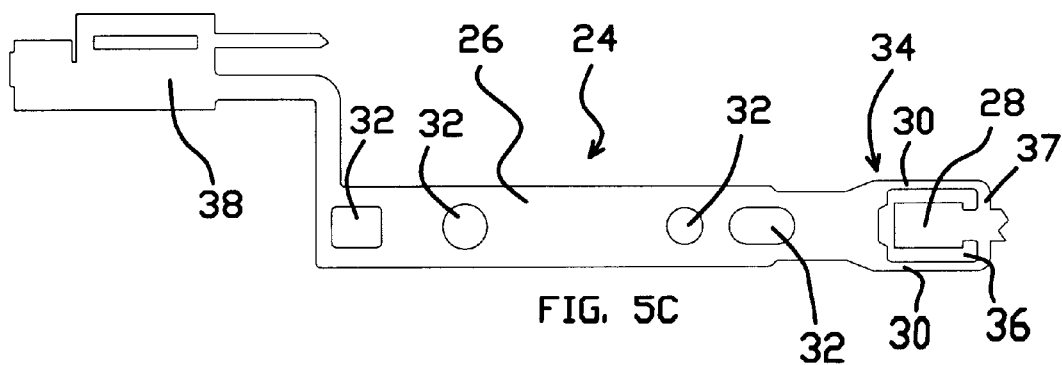

FIG. 3 shows a head suspension 12 having an integrated lead flexure 10 in accordance with the present invention mounted to a distal end of a load beam 14. Load beams such as 14 are well known and commercially available from a number of sources including Hutchinson Technology Incorporated of Hutchinson, Minn., the assignee of the present invention. Typically, load beam 14 includes a mounting region 16 at its proximal end, a relatively rigid region 18, and a spring region 20 between the mounting region 16 and the rigid region 18. The flexure 10 is welded or otherwise attached to the load beam 14 and is adapted to have a head slider (not shown) adhesively bonded to a slider bonding region 22.

Flexure 10 can be described in greater detail with reference to FIGS. 3–10. The integrated lead flexure 10 includes a metal spring layer 24 (perhaps best shown in FIG. 5C) with first (upper) and second (lower) surfaces having a metal base region 26, a metal head bonding platform 28, a metal cross member 37 and a pair of metal spring arms 30. The metal base region 26 is located at a proximal end of the flexure 10 and is attached to the relatively rigid region 18 of the load beam 14, typically by welding. In the embodiment shown in FIGS. 3–10, the metal base region 26 also includes holes 32 that may be used to align the flexure 10 about corresponding holes in the relatively rigid region 18 when the flexure 10 is attached to the load beam 14. Extending from the metal base region 26 is a metal gimbal region 34 that includes the metal spring arms 30, the metal cross member 37 and the metal head bonding platform 28. The metal cross member 37 and the metal head bonding platform 28 form a T-shaped structure at the distal end of the metal gimbal region 34 that is connected to the metal base region 26 by the metal spring arms 30 so as to allow motion about the pitch and roll axes. The metal head bonding platform 28 is adapted for attachment and support of the head slider (not shown) and is located adjacent to and in between the metal spring arms 30. In the embodiment shown in FIGS. 3–10, the metal head bonding platform 28 is a tongue-shaped cantilever beam extending from the metal cross member 37 of the flexure 10 towards the metal base region 26 and is separated from the metal base region 26 and the metal spring arms 30 by a gap 36. Also, the metal spring layer 24 includes a metal mounting region 38 that extends over a lateral edge of the mounting region 16 of the load beam 14 and beyond the lateral edge of the mounting region 16.

The integrated lead suspension flexure 10 also includes a lead structure 40 comprising a conductive lead layer 42 atop a hygroscopic insulator layer 44. The conductive lead layer 42 (perhaps best shown in FIG. 5A) has first (upper) and second (lower) opposed surfaces with the lower surface of the conductive lead layer 42 facing the upper surface of the metal spring layer 24 and generally separated therefrom by the insulator layer 44. Elongated, generally parallel signal leads 46 are formed in the conductive lead layer 42. Typically, the leads 46 are formed in pairs with an equal number of leads 46 on each lateral side of the flexure 10. The exact number and shape of the leads 46 are determined by the desired mechanical properties of the head suspension and by the electrical requirements of the head slider and the amplifying and processing circuitry (not shown) used to process the signals from the head slider. The leads 46 comprise lead mounting region portions 48 that extend generally over and beside the mounting region 16 of the load beam 14 and the metal mounting region 38, lead base region portions 50 that extend over the metal base region 26, and lead metal-backed arm portions 52, lead suspended portions 54, and lead cross member portions 55 that generally extend over the metal gimbal region 34. The lead metal-backed arm portions 52 extend from the lead base region portions 50 and are backed by the metal spring arms 30 of the metal gimbal region 34. The lead suspended portions 54 extend from the lead metal-backed arm portions 52 over gap 36 and are free from (i.e., they are not backed by) the metal spring layer 24. The lead suspended portions 54 are generally adjacent to the metal spring arms 30 and are separated therefrom by portions 56 of gap 36 (perhaps best shown in FIG. 6). The lead cross member portions 55 extend from the lead suspended portions 54 over the metal cross member 37. The leads 46 terminate in mounting region bonding pads 58 at proximal ends of the lead mounting region portions 48. The mounting region bonding pads 58 are electrically connected using conventional bonding techniques to amplifying and processing circuitry placed on the actuator arm or as part of the disk drive. The leads 46 terminate at distal ends of the flexure 10 in slider bonding pads 60 that are electrically connected to the head slider (not shown). In the embodiment shown in FIGS. 3–10, the slider bonding pads 60 are located on the metal head bonding platform 28.

The hygroscopic insulator layer 44 (perhaps best shown in FIG. 5B) of flexure 10, having first (upper) and second (lower) surfaces, is generally located between the metal spring layer 24 and the conductive lead layer 42 with the upper surface of the insulator layer 44 facing the lower surface of the conductive lead layer 42 and the lower surface of the insulator layer 44 facing the upper surface of the metal spring layer 24. In particular, the insulator layer 44 comprises insulator mounting region portions 61 that bond the lead mounting portions 48 to the metal mounting region 38 and insulator base region portions 62 that bond the lead base region portions 50 to the metal base region 26. The insulator layer 44 also comprises a pair of insulator metal-backed arm portions 64 that extend from the insulator base region portions 62 and bond the lead metal-backed arm portions 52 to and insulate the lead metal-backed arm portions 52 from the metal spring arms 30. The insulator layer 44 further comprises a pair of insulator suspended portions 66 that extend from the insulator metal-backed arm portions 64 and have their upper surfaces bonded to the lower surfaces of the lead suspended portions 54 and their lower surfaces free from the metal spring layer 24. The insulator metal-backed portions 64 and the insulator suspended portions 66 are arranged relative to one another in a generally serial fashion so that for each lateral side of the gimbal region the insulator metal-backed portions 64 and the insulator suspended portions 66 are adjacent to and longitudinally spaced from each other. The insulator layer 44 further includes at a distal end a pair of insulator cross member portions 63 extending from the insulator suspended portions 66 and bonding the lead cross member portions 55 to the metal cross member 37 and an insulator bonding pad portion 65 extending from the insulator cross member portions 63 and bonding the slider bonding pads 60 to the metal head bonding platform 28.

Figure 8A:
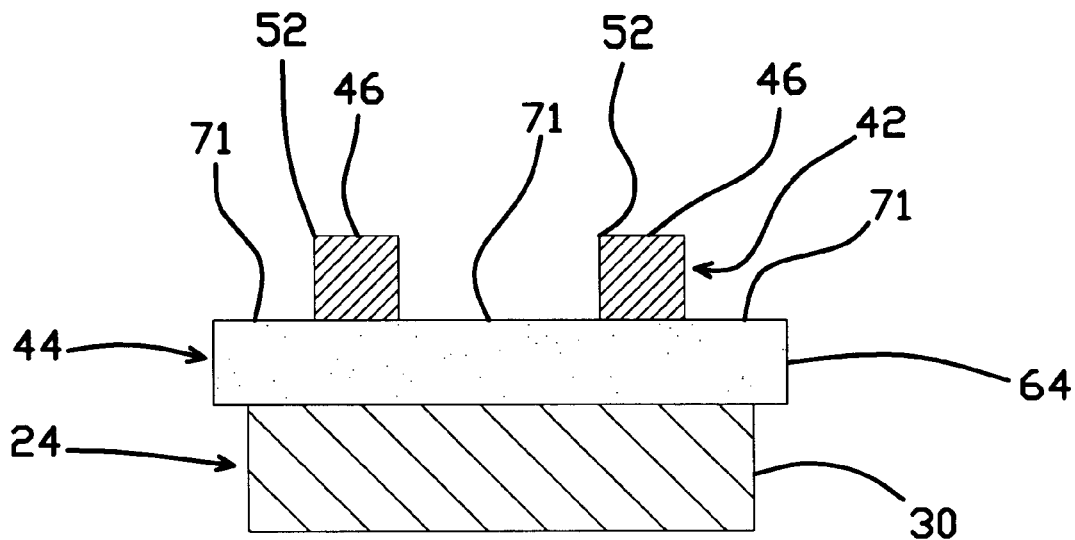
FIG. 8A is a cross sectional view of a metal-backed portion of the gimbal region shown in FIG. 6 taken across lines 8A—8A
Figure 8B:
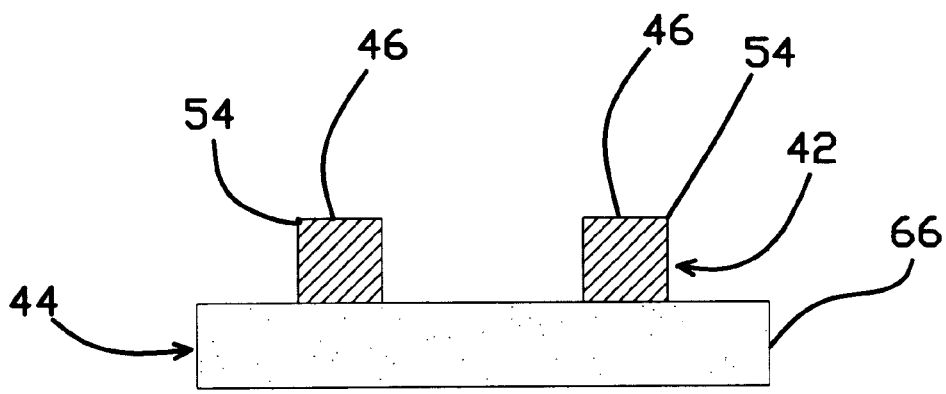
FIG. 8B is a cross sectional view of a suspended portion of the gimbal region shown in FIG. 6 taken across lines 8B—8B
Figure 9:
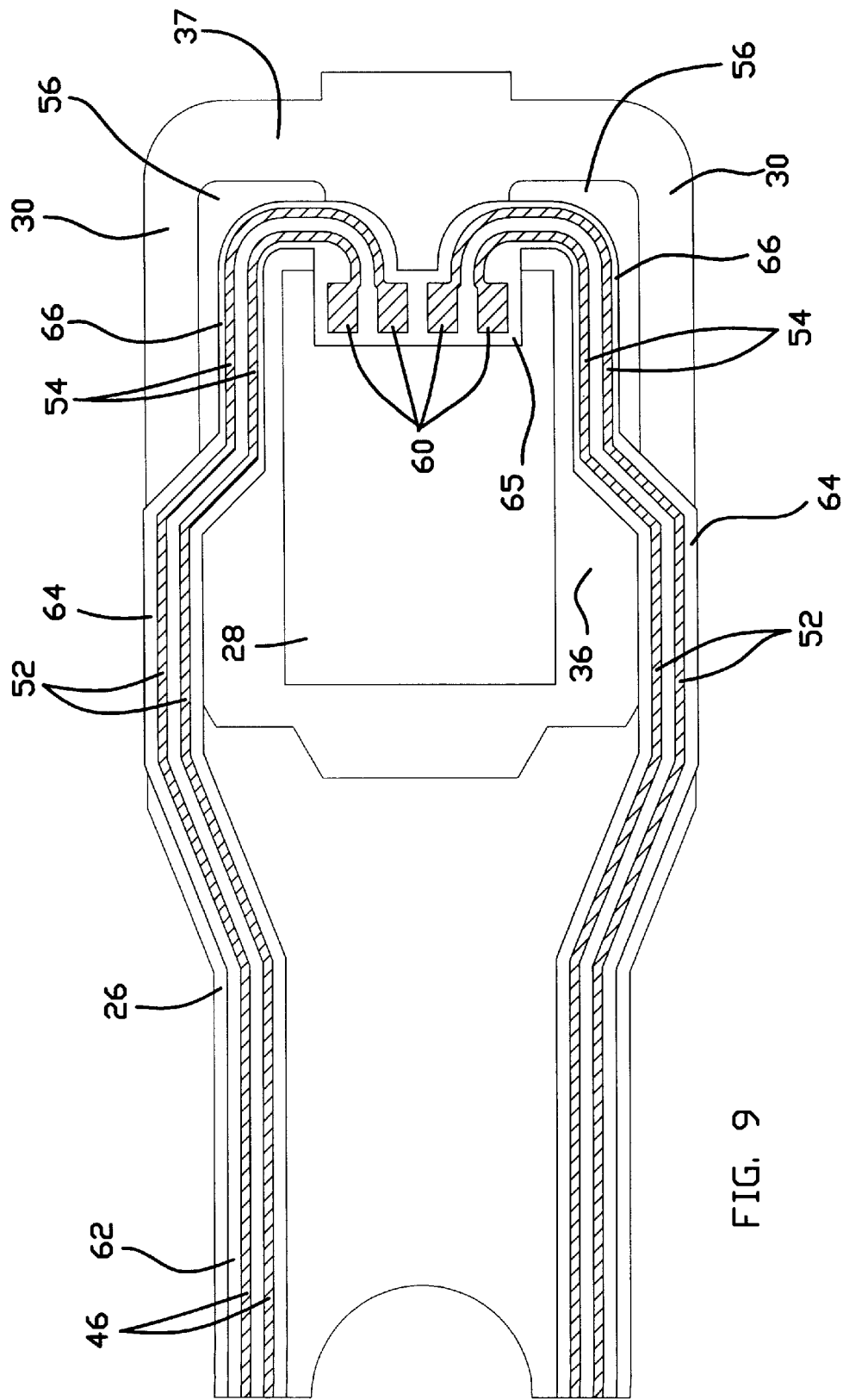
FIG. 9 is a detailed top view of the gimbal region shown in FIG. 6.
Figure 10:
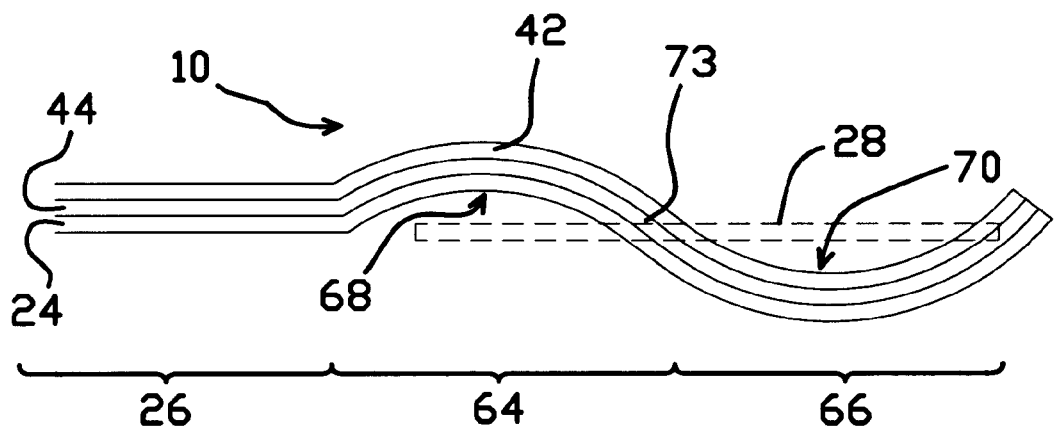
FIGS. 10 is a side view of the flexure shown in FIG. 4 under relatively humid conditions.
Figure 13:
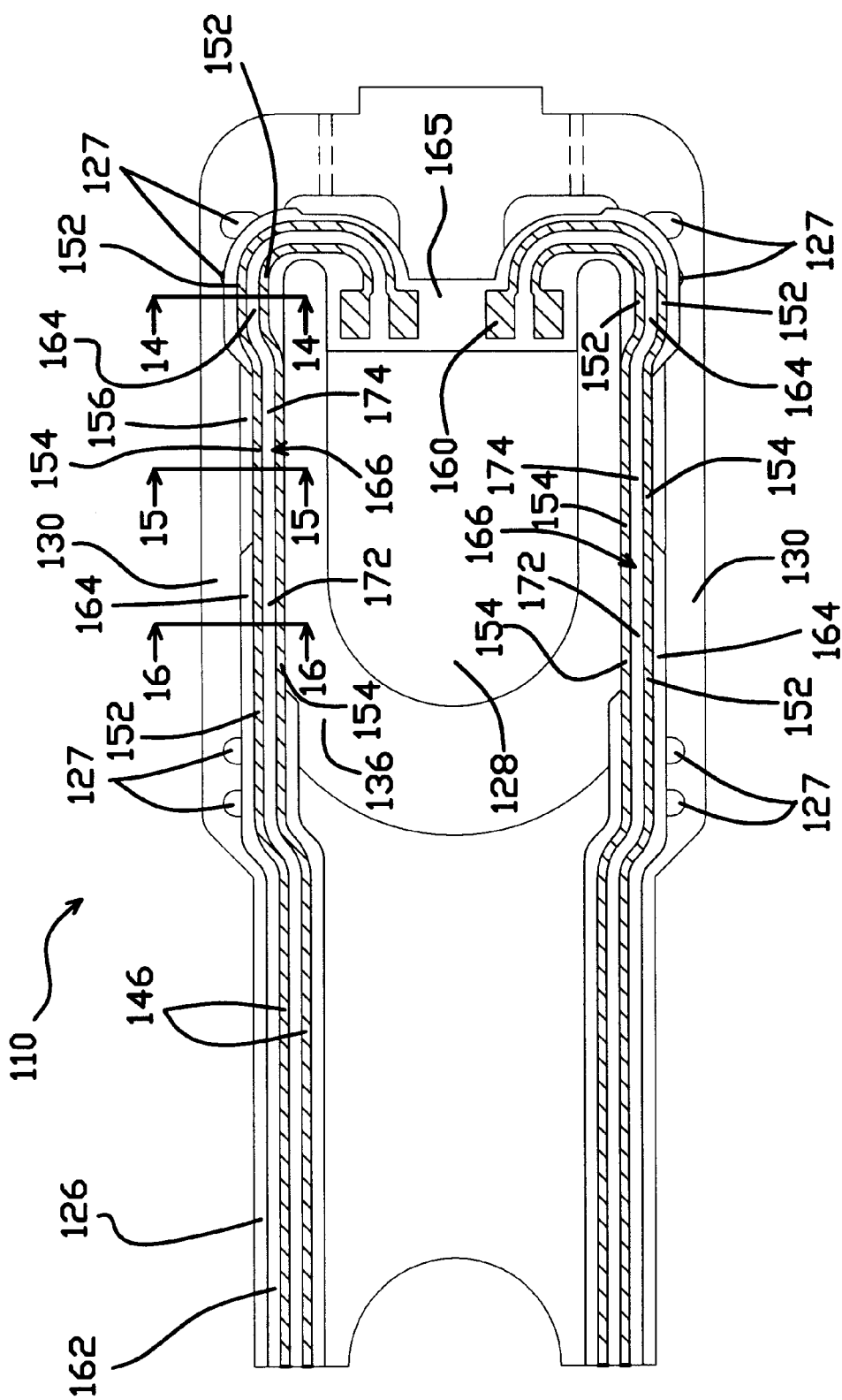
FIG. 13 is a detailed top view of the gimbal region shown in FIG. 11.
Figure 14:
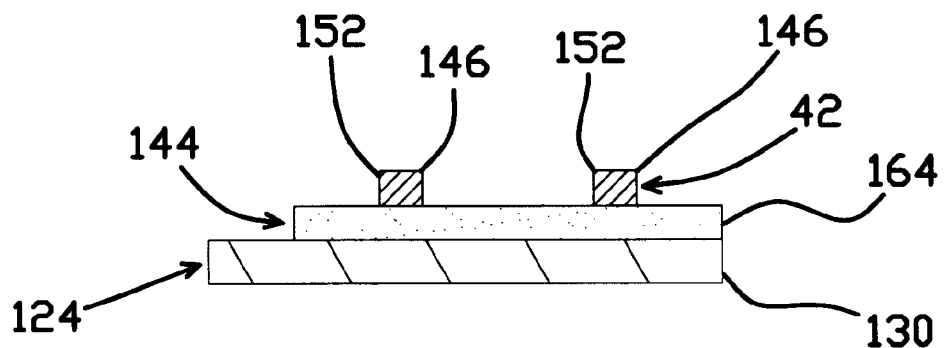
FIG. 14–16 are cross sectional views of the metal spring arm of the gimbal region shown in FIG. 13 taken across lines 14—14, 15—15, and 16—16, respectively.
Figure 15:
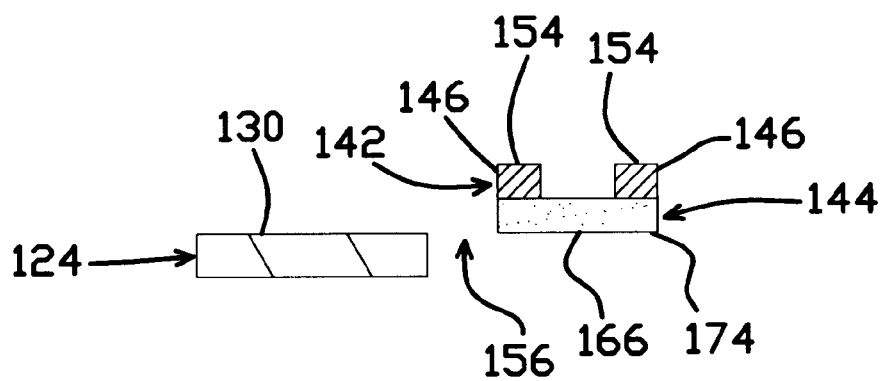
Figure 16:
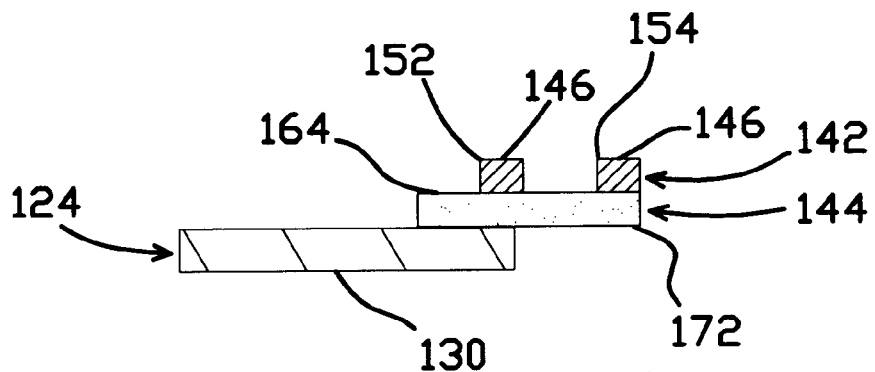

FIG. 10 is a side view of the flexure 10 under relatively humid conditions. Constraining the upper surfaces of the insulator metal-backed arm portions 64 with the leads 46 and the lower surfaces of the insulator metal-backed arm portions 64 with the metal spring arms 30 significantly reduces hygroscopic deformation. However, the insulator metal-backed arm portions 64 are not completely constrained on the upper surface by the leads 46. For example, as shown in FIG. 8A, there are unconstrained parts 71 of the upper surface of the insulator metal-backed arm portions 64 between and on the sides of the two leads 46. As shown in FIG. 10, in relatively humid conditions, the partially unconstrained insulator layer 44 tends to induce a first curvature 68 that forms a generally concave shape in the lower surface of the metal spring layer 24 along the insulator metal-backed arm portions 64 of the gimbal region. To counteract the effects of the first curvature 68, the serial arrangement of the insulator suspended portions 66 induces a second curvature 70 in the lower surface of the metal spring layer 24 along the insulator suspended portions 66 that forms a generally convex shape having a magnitude similar to the first curvature and curving in a direction generally opposite that of the first curvature 68. The first curvature 68 extends from a distal edge of the metal base region 26 along the insulator metal-backed arm portions 64 to node point 73, and the second curvature 70 extends from the node point 73 along the insulator suspended portions 66 to the distal tip of the flexure 10. The node point 73 is defined by the inflection point at which the first curvature 68 and the second curvature 70 meet. The effects from hygroscopic deformation of the insulator layer 44 on the flexure 10 can be effectively reduced if the serial arrangement of the insulator metal-backed arm portions 64 and the insulator suspended portions 66 results in minimum or no change in the static attitude of the head slider attachment site located on the metal head bonding platform 28.

Integrated lead suspension flexure 110, a second embodiment of the present invention, is shown in FIGS. 11–16. The flexure 110 is similar to flexure 10 (except as described below) and can be fabricated using similar processes described below. Elements of flexure 110 that have corresponding elements in flexure 10 are referenced with numerals that are incremented by one hundred (e.g., the metal spring layer 24 of flexure 10 corresponds to metal spring layer 124 of flexure 110). Additional features formed in the metal spring layer 124 of the flexure 110 (perhaps shown best in FIG. 12B) include recesses 131 formed in the metal layer spring arms 130 and having first and second steps 133 and 135. Also, four pairs of holes 127 are formed in the four corners of the metal gimbal region 134. Additional features formed in the insulator layer 144 (perhaps shown best in FIG. 12A) include insulator suspended portions 166 comprising first suspended portions 172 extending from a lateral edge of the metal spring arms 130 and second suspended portions 174 that are separated from a lateral edge of the metal spring arms 130 by portions 156 of the gap 136. The first suspended portions 172 are suspended (i.e., are not backed by the metal spring layer 124) due to voids formed in the metal springs arms 130 by the first steps 133. The second suspended portions 174 are suspended due to voids formed in the metal spring arms 130 by the second steps 135. The second suspended portions 174 are separated from the metal spring arms 130 by portions 156 of the gap 136. Portions 156 are defined by the intersections of voids formed by recesses 131 in the metal spring layer 124 and recesses 176 formed in the insulator layer 144. The insulator suspended portions 166 further comprise hole suspended portions 178 that are suspended due to holes 127 formed in the metal spring layer 126. Forming the insulator metal-back arm portions 164 and the insulator suspended portions 166 with the various recesses in the metal spring and insulator layers 124 and 144 allows the leads 146 to be routed so as to optimize the pitch and roll stiffness of the gimbal region.

Figure 17:
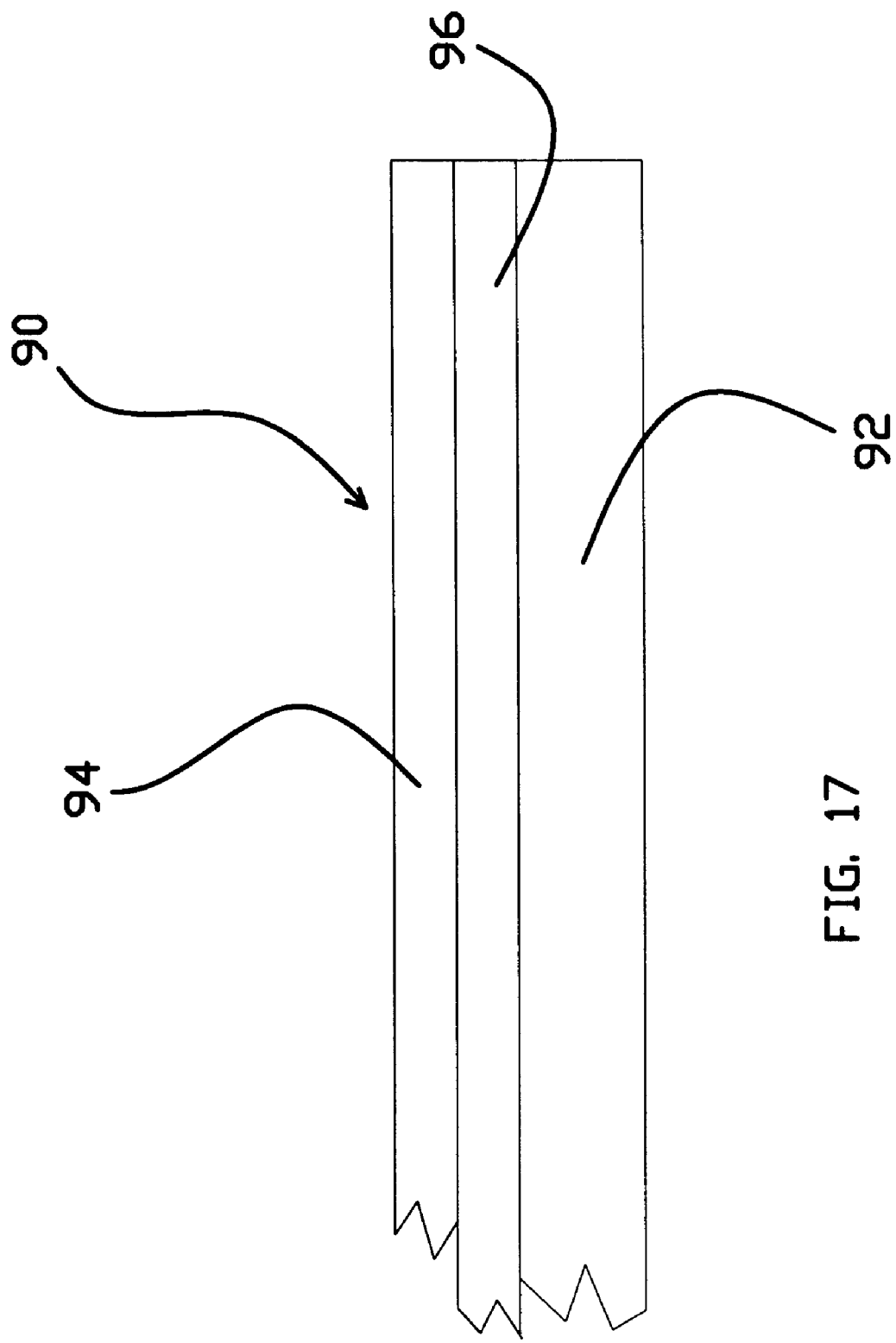
FIG. 17 is a cross sectional view of a la laminate used to fabricate a flexure in accordance with the present invention.

A method for fabricating the flexure 10 (and, similarly, flexure 110) includes providing a laminated material sheet 90 such as that shown in FIG. 17. Laminated sheet 90 includes a spring metal layer 92 and a conductive metal layer 94 which are separated from one another and bonded together by a dielectric insulator layer 96. Laminated sheets such as 90 are commercially available from a number of sources including Rogers Corporation of Chandler, Ariz. In one embodiment, the spring metal layer 92 is a stainless steel layer having a thickness of about 18 micrometers to 25 micrometers. The conductive metal layer 94 is a layer of C7025 copper alloy having a thickness of about 10 micrometers to 18 micrometers. The dielectric layer 96 is a polyimide layer having a thickness of about 10 micrometers to 18 micrometers. The flexure fabrication method further includes the steps of forming the metal spring layer 24 in the spring metal layer 92, forming the conductive lead layer 42 in the conductive metal layer 94, and forming the insulator layer 44 in the dielectric layer 96 using photolithographic etching processes. Alternatively, flexure 10 can be fabricated using an additive process wherein the insulator and conductive lead layers 44 and 42 are deposited on a metal spring layer 24 using commonly known deposition techniques such as vapor deposition.

In other embodiments of the present invention (not shown), the flexure is formed integrally with the load beam. Such an integrally formed integrated lead head suspension can be fabricated using processes similar to the processes disclosed in U.S. Pat. No. 5,598,307 issued to Bennin. In such an integrally formed head suspension, a metal gimbal region similar to the metal gimbal region 34 of the flexure 10 shown in FIGS. 3–10 extends from the distal end of a load beam and is formed from the same metal layer as the load beam. For example, the load beam and metal gimbal region could be formed from the spring metal layer 92 of the laminate 90 shown in FIG. 17. Conductive and insulator layers similar to the conductive and insulator layers 42 and 44 of the flexure 10 shown in FIGS. 3–10 could be formed in the conductive metal and insulator layers 94 and 96 of the laminate 90 in order to provide the serial arrangement of insulator metal-backed arm portions and insulator suspended portions for hygrothermal compensation.

The flexure of the present invention offers a number of important advantages. The effects on the slider bonding region from hygrothermal changes in the insulator layer can be reduced without substantially increasing the stiffness of the gimbal region. Therefore, the flexure can provide increased environmental stability while still allowing appropriate gimbal action. Another advantage is that the flexure of the present invention can be fabricated from a laminate using photolithographic chemical etching processes which are efficient, accurate, and economical.

Although the present invention has been described with reference to preferred embodiments, those skilled in the art will recognize that changes may be made in form and detail without departing from the spirit and scope of the invention.

What is claimed is:

1. A flexure for an integrated lead head suspension, including:

a metal spring layer having first and second opposed surfaces, including:
   a metal base region;
   a metal head bonding platform; and
   one or more metal spring arms connecting the metal head bonding platform to the metal base region for flexure motion;

a conductive lead layer having first and second opposed surfaces, the second surface facing the first surface of the metal spring layer, and extending between the metal base region and the metal head bonding platform, including:
   lead base region portions extending over the metal base region;
   lead metal-backed arm portions extending over the metal spring arms; and
   lead suspended portions extending from at least one of the lead metal-backed arm portions; and an insulator layer between the metal spring layer and the conductive lead layer, including:
   insulator base region portions for bonding the lead base region portions to and insulating the lead base region portions from the metal base region;
   insulator metal-backed arm portions for bonding the lead metal-backed arm portions to and insulating the lead metal-backed arm portions from the metal spring arms, wherein a first curvature is induced on each insulator metal-backed arm portion when the insulator layer undergoes volumetric variations; and
   insulator suspended portions on the second surface of the lead suspended portions, wherein a second curvature is induced on each insulator suspended portion when the insulator layer undergoes volumetric variations;

wherein the insulator metal-backed arm portions and the insulator suspended portions are longitudinally spaced from each other in a serial arrangement so that the direction of the first curvature is opposite the direction of the second curvature.

2. The flexure of claim 1 further including:
a node point defined by an inflection point at which the first and second curvatures meet; and
a head slider attachment site located on the metal head bonding platform having a center,
wherein the insulator metal-backed arm portions and the insulator suspended portions have a serial arrangement effective to align the node point with the center of the head slider attachment site.

3. The flexure of claim 1, wherein the metal spring layer comprises stainless steel, the conductive lead layer comprises copper or copper alloy, and the insulator layer comprises polyimide.

4. The flexure of claim 1, wherein the insulator suspended portions further include:
first suspended portions extending from a lateral edge of the metal spring arms; and
second suspended portions that are separated from a lateral edge of the metal spring arms by gaps formed by intersections of a plurality recesses formed in the metal spring arms and a plurality of recesses formed in the insulator suspended portions.

5. A method of fabricating an integrated lead suspension flexure, comprising the following steps:
forming a metal spring layer having first and second opposed surfaces, wherein the
metal spring layer includes:
a metal base region;
a metal head bonding platform; and
one or more metal spring arms connecting the metal head bonding platform to the metal base region for flexure motion;
forming a conductive lead layer having first and second opposed surfaces, the second surface facing the first surface of the metal spring layer, and extending between the metal base region and the metal head bonding platform, wherein the conductive lead layer includes:
lead base region portions extending over the metal base region;
lead metal-backed arm portions extending over the metal spring arms; and
lead suspended portions extending from at least one of the lead metal-backed arm portions; and
forming an insulator layer between the metal spring layer and the conductive lead layer, wherein the insulator layer includes:
insulator base region portions for bonding the lead base region portions to and insulating the lead base region portions from the metal base region;
insulator metal-backed arm portions for bonding the lead metal-backed arm portions to and insulating the lead metal-backed arm portions from the metal spring arms, wherein a first curvature is induced on each insulator metal-backed arm portion when the insulator layer undergoes volumetric variations; and
insulator suspended portions on the second surface of the lead suspended portions, wherein a second curvature is induced on each insulator suspended portion when the insulator layer undergoes volumetric variations;

wherein the metal spring layer forming step, the conductor lead layer forming step, and the insulator layer forming step include shaping and arranging the insulator metal-backed arm portions and the insulator suspended portions so that the insulator metal-backed arm portions and the insulator suspended portions are longitudinally spaced from each other in a serial arrangement so that the direction of the first curvature is opposite the direction of the second curvature.

6. The method of claim 5, further comprising the step of providing a laminate of a spring metal layer, a conductive metal layer, and an insulator layer in between the spring metal layer and the conductive metal layer, and wherein the metal spring layer forming step comprises forming the metal spring layer in the spring metal layer of the laminate, the conductive lead layer forming step comprises forming the conductive lead layer in the conductive metal layer of the laminate, and the insulator layer forming step comprises forming the insulator layer in the insulator layer of the laminate.

7. The method of claim 5, wherein the metal spring layer forming, conductor lead layer forming, and insulator layer forming steps comprise photolithographic chemical etching.

8. A flexure for an integrated lead head suspension, comprising:
a metal spring layer for supporting a slider at a distal end thereof; a lead structure coupled to the metal spring layer having a conductor extending across the flexure and an insulator formed on a major surface of the conductor;
wherein the lead structure has a first portion that urges a first curvature on the flexure when the insulator layer undergoes volumetric variations, and a second portion that urges a second curvature on the flexure when the insulator undergoes volumetric variations, and
wherein the first and second portions are longitudinally spaced from each other in a serial arrangement so that the direction of the second curvature opposes the first curvature.

9. The flexure of claim 8, wherein:
the metal spring layer has a bonding platform at a distal end of the metal spring layer for supporting the slider and a metal spring arm transversely spaced from the bonding platform and separated therefrom by a gap; and
the first portion extends over the metal spring arm and the second portion extends over the gap.

10. A flexure for an integrated lead head suspension, comprising:
a metal spring layer having a gimbal region that includes a bonding platform at a distal end of the metal spring layer for supporting a slider and a metal spring arm transversely spaced from the bonding platform and separated therefrom by a gap; and
a lead structure coupled to the metal spring layer having a conductor extending across the flexure and an insulator formed on a major surface of the conductor;
wherein the lead structure has a gimbal portion extending over the gimbal region, the gimbal portion comprising:
a metal-backed lead structure portion extending directly over the metal spring arm, wherein a metal-backed portion of the insulator is sandwiched between a metal-backed portion of the conductor and the metal spring arm, wherein the metal-backed lead structure portion urges a first curvature on the flexure when the insulator layer undergoes volumetric variations; and a suspended lead structure portion extending from the metal-backed lead structure portion directly over the gap, wherein a suspended portion of the insulator has a first surface on which a suspended portion of the conductor is formed and a second surface opposite the first surface facing the gap, wherein the suspended lead structure portion urges a second curvature on the flexure when the insulator undergoes volumetric variations; and wherein the metal-backed lead structure portion and the suspended lead structure portion are longitudinally spaced from each other in a serial arrangement so that the direction of the second curvature opposes the first curvature.

* * * * *